July 15, 1924.

R. P. LEWIS

LANDING SKID FOR AMPHIBIAN AIRCRAFT

Filed Jan. 30, 1922

1,501,608

Witness.
*Elmer E. Prusse*
*A. Bondar*
By

Inventor.
*Robert P. Lewis*
*Ralph H. Chilton*
Attorney.

Patented July 15, 1924.

1,501,608

UNITED STATES PATENT OFFICE.

ROBERT P. LEWIS, OF DAYTON, OHIO, ASSIGNOR TO DAYTON-WRIGHT COMPANY, OF DAYTON, OHIO, A CORPORATION OF DELAWARE.

LANDING SKID FOR AMPHIBIAN AIRCRAFT.

Application filed January 30, 1922. Serial No. 532,676.

*To all whom it may concern:*

Be it known that I, ROBERT P. LEWIS, a citizen of the United States of America, residing at Dayton, county of Montgomery, and State of Ohio, have invented certain new and useful Improvements in Landing Skids for Amphibian Aircraft (Docket #48), of which the following is a full, clear, and exact description.

This invention relates to landing gear for water aircraft which is also adapted for landing on a solid surface such as the deck of a ship, and has especial reference to the landing skid which is attached to the rear end of the float.

Heretofore objections have arisen in pivoting the landing skid on the rear end of the float since usually either the upper part of the skid or the shock absorber extends within the contour of the float. This prevents the rear end of the float from being used as an air chamber since the shell of the float must be pierced, and hence the displacement of the float is reduced.

An object of this invention is to provide a tail skid which does not necessitate the piercing of the float shell and therefore permits the entire float to be used as an air chamber.

Another object is to provide such a tail skid having its resultant upward pressure upon landing substantially on the center line of the float.

Further objects and advantages of the present invention will be apparent from the following description, reference being had to the accompanying drawing, wherein a preferred form of embodiment of the present invention is clearly shown.

In the drawing.

Similar reference characters refer to similar parts throughout the drawing.

Figure 2:
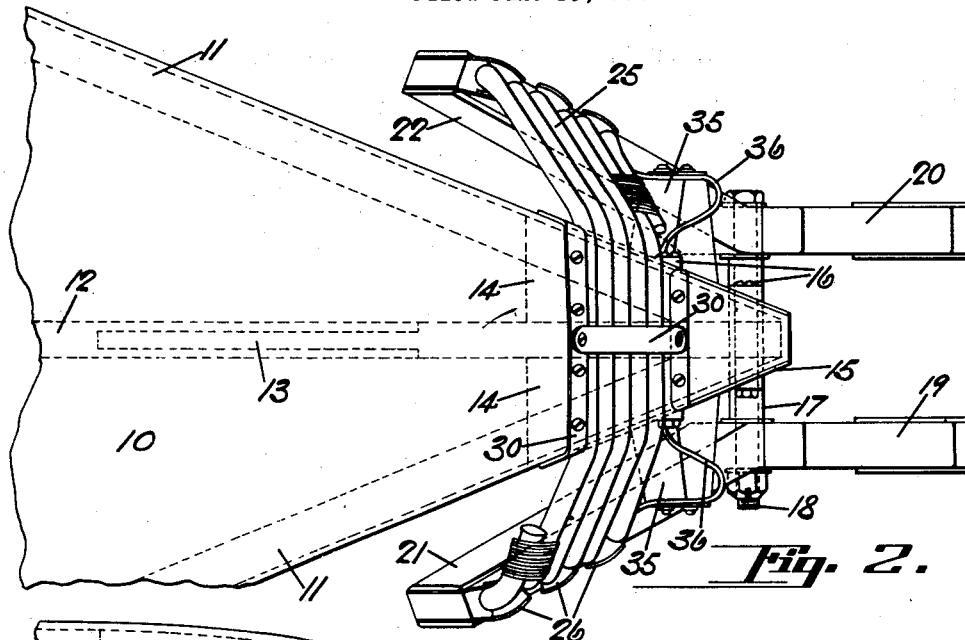
Fig. 2 is a plan view showing the tail skids in their normal position.

Numeral 10 indicates the wooden float, which may be built up in various ways and the use of my invention is not dependent upon the particular construction of the float. Herein I have shown the float frame constructed with the chine stringers 11 and the central deck stringer 12 having their ends suitably fixed at the rear tip of the float. The rear end of the float is strengthened by the reinforcing brace 13 which is mortised to the central deck stringer 12 and in effect forms a continuation thereof, as clearly illustrated.

A fitting 15 is bolted to the rear tip of the float by means of bolts 16. Fitting 15 is provided with a bracket 17 which supports the pivot pin 18 for the two landing skids 19 and 20. The upper arms 21 and 22 of the landing skids are bent outward from the float 10 so that they have a path of movement alongside the sides of the float. Preferably the float is constructed with plane vertical sides at the rear, in which case the arms 21 and 22 have a path of movement parallel to the float sides.

Figure 1:
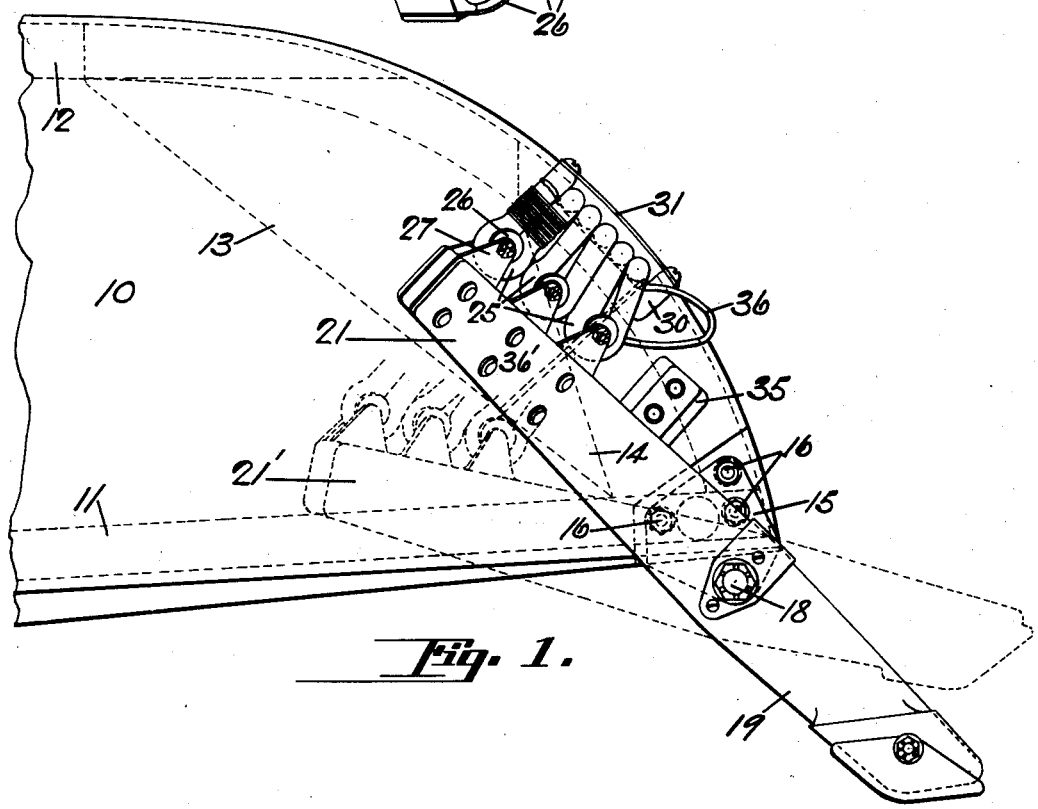
Fig. 1 is a side elevation of the rear end of a float embodying my invention.

The shock absorber cord 25 extends across the float and is attached to the ends of arms 21 and 22 preferably by means of small sheaves 26 which permit the various strands of cord 25 to be of substantially equal tension. A bearing plate or fitting 30 is provided where the shock absorber cords 25 bear against the float. I have shown this fitting 30 set into the shell of the float but of course, if desired, this fitting may be attached to the float without countersinking. Two spruce blocks 14 are provided to strengthen the support for the fitting 30, as clearly illustrated. A strap 31 is screwed to fitting 30 to prevent possible disarrangement of the strands of cord 25. Two wooden blocks 35 are bolted to the sides of the float to serve as stops for the normal position of arms 21 and 22. Fig. 1 shows in dotted lines the position of the skid when deflected its maximum amount. A wire cable 36 attached to the two arms 21 and 22 and passing over the fitting 30 serves as a stop for the deflected position of the skids as shown at 36'.

It is clear that my invention permits a very light form of skid construction and the entire hulk of the float may be utilized as an air chamber since no parts of the skid or shock absorber project within the contour of the hulk. Also since all parts are exterior to the float they are more accessible for inspection and repairs. By having the two skids 19 and 20 spaced equally from the center line of the float the resultant upward pressure on the skids will fall on the center line of the float.

A modification of this invention comprises a single skid pivoted on the center line of the float but branched to have two upper arms to correspond to the arms 21 and 22. Such a skid would in effect be obtained simply by moving skids 19 and 20 immediately adjacent one another, of course changing the design slightly to permit this.

While the form of mechanism herein shown and described, constitutes a preferred form of embodiment of the present invention, it is to be understood that other forms might be adopted, all coming within the scope of the claims which follow.

What I claim is as follows:

1. In an amphibian seaplane, in combination, a float having a wedge shape rear end, a fitting attached thereto substantially at its rearmost tip, a tail skid pivoted to said fitting, and yieldable means connecting the upper part of the skid to the float.

2. In an amphibian aircraft, in combination, a float having a wedge shape rear end, a fitting attached thereto substantially at its rearmost tip, a tail skid pivoted to said fitting and having a path of movement along the side of said float, and yieldable means connecting the upper part of the skid to the float.

3. In an amphibian aircraft, in combination, a float having a wedge shape rear end, a fitting attached thereto substantially at its rearmost tip, a tail skid pivoted to the fitting and having its upper part offset so that its path of movement is at the side of said float, and shock absorbing means extending between the upper part of the skid and the float for holding the skid in its normal position.

4. In a seaplane, in combination, a float, an independently rotatable landing skid pivoted on each side of the float, and common means supported on the float for holding said skids in their normal position.

5. In a seaplane, in combination, a float having a fitting on its lower rear end, a landing skid pivoted on said fitting and having its path of movement entirely without the contour of said float, and shock absorbing means connecting the upper arm of said skid to said float.

6. In a seaplane, in combination, a float having a wedge shape rear end, a fitting attached thereto substantially at its rearmost tip, a landing skid pivoted on each side of said fitting and having their paths of movement entirely without the contour of said float, and yieldable means connecting the upper arms of said skids to said float.

7. In a seaplane, in combination, a float, a landing skid pivoted on each side of the rear tip of said float and having their paths of movement entirely without the contour of said float, and yieldable means connecting the upper arms of said skids across the top of said float.

In testimony whereof I hereto affix my signature.

ROBERT P. LEWIS.

Witnesses:
E. E. Freed,
Wm. P. Pasco.